April 14, 1953     E. R. FITCH     2,634,784
TIRE INFLATION CONTROL SYSTEM
Filed Oct. 30, 1950
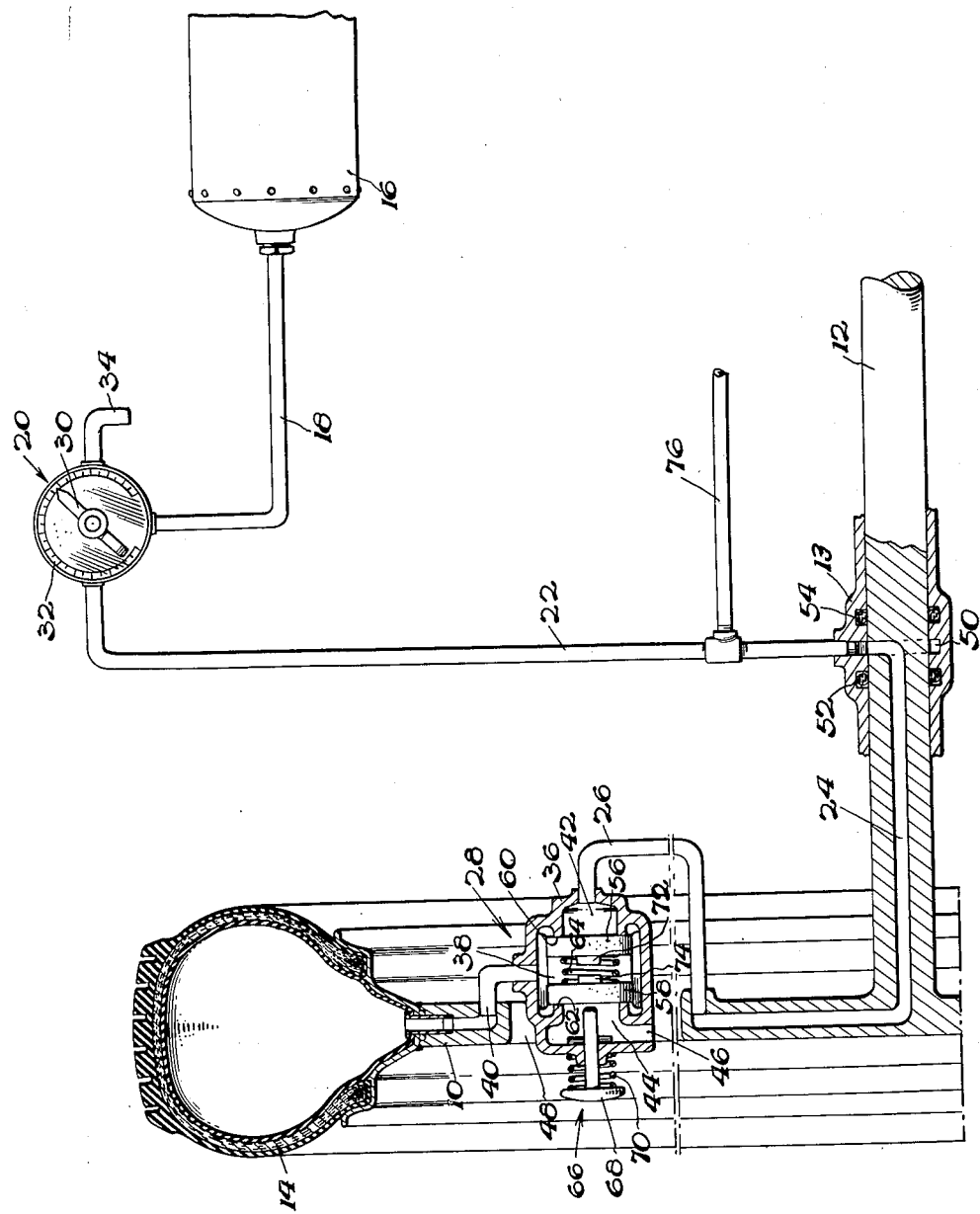
INVENTOR
*Ellery R. Fitch.*
BY
*Scrivener & Parker*
ATTORNEYS Patented Apr. 14, 1953

2,634,784

UNITED STATES PATENT OFFICE 2,634,784

TIRE INFLATION CONTROL SYSTEM

Ellery R. Fitch, Elyria, Ohio, assignor to Bendix-Westinghouse Automotive Air Brake Company, Elyria, Ohio, a corporation of Delaware Application October 30, 1950, Serial No. 192,960

7 Claims. (Cl. 152—417)

This invention relates to systems for controlling the inflation pressures of vehicle tires, and more particularly to a novel arrangement which employs a single conduit system extending from a source of compressed air on the vehicle to the pneumatic tires.

Systems for automatically controlling the inflation pressures of vehicle tires while the vehicle is in motion have heretofore been proposed. In one known arrangement, a single conduit system is employed for charging the tires to the desired pressure, the control of pressure being governed by a self-lapping valve of usual type. A check valve is utilized in this arrangement for retaining the air in the tire so that after the desired inflation pressure has been reached, the self-lapping valve may be exhaused in order to relieve the air pressure on the rotary seals. However, in the prior systems, certain objections have arisen due to the use of complicated and costly constructions when it is desired to decrease the tire pressures below the original inflation pressures. In addition, such systems have exhausted the excess air pressure through the self-lapping valve, which is objectionable from a time-saving standpoint. Accordingly, the principal object of the present invention is to provide a tire inflation system which is so constituted as to avoid the objections and disadvantages of the systems heretofore proposed.

Another object is to provide a tire inflation system of the single conduit type wherein the tire pressures may be lowered without the necessity of exhausting the excess air through the control valve which governs the initial inflation pressures.

Still another object is to provide in a system of the foregoing character, a novel arrangement for manually exhausting excess pressure directly at the vehicle tire, thus materially simplifying prior constructions of this general type.

Other objects and novel features of the invention will appear more fully hereinafter from a consideration of the following description when taken in connection with the accompanying drawing, which illustrates one form of the invention. It is to be expressly understood, however, that the drawing is utilized for purposes of illustration only and is not to be taken as a definition of the limits of the invention, reference being had for this purpose to the appended claims.

In the drawing, the single figure is a diagrammatic view partly in section of a vehicle tire inflation system embodying the principles of the present invention. More particularly, the invention is illustrated in connection with a single pneumatic tire. It will be understood however that the invention is also applicable to the control of the inflation pressure of all of the vehicle tires in a manner which will be more particularly pointed out hereinafter.

As shown, the invention is disclosed as being associated with a vehicle wheel 10 which is suitably secured to an axle 12, the latter being rotatably supported by an axle housing 13. The wheel 10 carries a pneumatic tire 14 of well known construction and as will appear hereinafter, the invention provides a novel arrangement for controlling the inflation pressure in the tire 14 while the vehicle is in motion.

In order to provide for the inflation pressure control of the tire 14, as stated above, a reservoir 16 is suitably mounted on the vehicle and is adapted to supply the tire 14 with compressed air by way of conduit 18, a manually controlled feed valve 20, a conduit 22, a duct 24 formed in the axle 12 and wheel 10, a conduit 26 and a valve device 28 carried by the vehicle wheel 10. The feed valve 20 may be of any suitable construction and is so arranged as to be manually adjustable in order to control the amount of pressure conducted from the conduit 18 to the conduit 22. Preferably, the valve 20 is provided with an indicator 30 which is cooperable with a scale 32, in order to inform the operator as to the pressure to which the valve 20 is set. In its exhaust or "off" position, the valve 20 shuts off the conduit 18 and connects the conduit 22 with an atmospheric connection 34. On the other hand, when the valve 20 is moved to the desired indicated pressure, the same functions to deliver that pressure to the conduit 22 from the reservoir 16.

The control valve device 28 constitutes a novel arrangement whereby the flow of air pressure is readily permitted from the conduit 26 to the tire 14 while return flow is prevented. In addition to this function, the valve device also permits the pressure in the tire 14 to be manually reduced when it is desired to lower the pressure in the tire. To this end, the valve device 28 comprises a casing 36 provided with an outlet chamber 38 which is in constant communication with the tire 14 as by means of a conduit 40. The casing 36 is also provided with an inlet chamber 42, connected with the conduit 26, and an outlet chamber 44 in constant communication with an atmospheric port 46. Valve device 28 is carried by the wheel 10 through means of a bracket 48 and from this construction, it will be understood that the valve device 28 and the parts connected thereto all rotate with the vehicle wheel. Since the axle 12 and the housing 14 are relatively rotatable, the conduit 22 is provided with an annular chamber 50 which is in communication at all times with the inner end of the duct 24. Suitable seals 52 and 54 serve to prevent any loss of air in the running joint or gland provided by the axle housing 14.

In order to maintain the air pressure in the tire 14 and to provide a novel arrangement for lowering this pressure at the will of the operator, the valve device 28 includes a pair of independent check valves 56 and 58, these being resiliently urged to closed position against their respective seats 60 and 62 as by means of a spring 64. Due to this construction, it will be readily seen that after the tire 14 has been inflated to the desired pressure, the feed valve 20 may be moved to exhaust position whereupon the check valves 56 and 58 will prevent any loss of air from the tire. It will also be seen that under these conditions, pressure on the seals 52 and 54 will be relieved so that all danger of loss of air from the system will be avoided.

A novel arrangement is provided for lowering the pressure in the tire 14 whenever this appears to be advisable. In the form shown, the lowering of the tire pressure may be readily effected by means of manual operation of a push button 66 which is slidably mounted in the casing 36 and is provided with an exterior head 68 which may be manually moved inwardly, against the tension of a spring 70 in order to bring the inner end of the push button into contact with the check valve 58 and to open the latter against the tension of the spring 64. When this action takes place, the interior of the tire 14 is connected to the atmospheric connection 46 by way of conduit 40, outlet chamber 38 and exhaust chamber 44. In this manner, the pressure in the tire 14 may be lowered.

In lowering the tire pressure, the vehicle is stopped and the feed valve 20 is set to supply a lowered pressure to the conduit 22. Thereafter, the push putton 66 is manipulated in the manner above indicated and the pressure in the tire 14 lowered to a value below the setting of the feed valve 20. Thereafter, when the push button 66 is allowed to be returned to its normal position, the check valve 58 closes and the pressure in the tire 14 is automatically built up to the value determined by the setting of the feed valve 20.

An important feature of the invention resides in positively holding the check valve 56 in its closed position upon operation of the manual button 66. This is brought about by providing the check valves 56 and 58 with abutments 72 and 74 which engage each other as the check valve 58 is moved to full open position. Thus, when the pressure in the tire 14 is being lowered, the check valve 56 is positively maintained in closed position against the pressure delivered by the feed valve 20.

In operation, it will be understood that the valve 20 when moved to the desired position, functions to deliver air pressure from the reservoir 16 through the conduit 22, the duct 24, the conduit 26 and past the check valve 56 to the tire 14 in order to charge the latter to the predetermined inflation pressure. A conduit 76, connected with the conduit 22 may be connected to other tires on the vehicle in the manner illustrated in the drawing, in order that such other tires may be likewise charged. As soon as the tires have been charged to the desired pressure, the feed valve 20 is moved to its exhaust position and the pressures acting on the seals 52 and 54 are thus relieved. Check valve 56 will then serve to prevent any return flow of the air in the tire 14.

Under certain conditions, it may be desirable to reduce the pressure in the tire 14. When this appears necessary or desirable, the vehicle is stopped and the feed valve 20 is moved to admit the desired lowered pressure to the conduit 22. Push button 66 is then moved inwardly by the operator in order to open the check valve 58 and to positively maintain the check valve 56 closed through cooperation of abutments 72 and 74. When sufficient air has been exhausted from the tire 14, the push button 66 is released and the check valve 58 returns to its closed position. Thereupon, the pressure in the tire 14 is built up to the value determined by the setting of the feed valve 20 and thereafter, the latter valve is returned to its exhaust position.

It will be readily seen that the invention provides an unusually simple yet effective method of controlling the pressures of the vehicle tires while the vehicle is in motion. A single conduit system is employed between the rotating tire and the vehicle frame and the construction is such that after the tire has been inflated, the feed valve 20 may be moved to exhaust position in order to relieve the pressure acting on the rotary seals 52 and 54. A further feature includes the novel arrangement of the manually operable push button 66 which is effective to reduce the pressure in the tires directly at the wheels. With such an arrangement, it is unnecessary to exhaust the air from the tires back through the feed valve 20, thus materially simplifying the constructions of prior systems wherein, when the tire pressures were lowered, it was necessary to exhaust the air back through the control valve on the vehicle.

While one embodiment of the invention has been disclosed and described herein with considerable particularity, it will be readily understood by those skilled in the art that various modifications may be resorted to without departing from the spirit of the invention. Resort will therefore be had to the appended claims for a definition of the limits of the invention.

What is claimed is:

1. A tire inflation control system for a vehicle wheel having a pneumatic tire mounted thereon, comprising a control valve carried by the wheel and provided with a casing having an outlet chamber in communication at all times with the tire and having also an exhaust chamber in communication at all times with the atmosphere, a source of compressed air, means including a conduit for conducting compressed air from said source to said outlet chamber, a first spring-closed check valve in said outlet chamber for preventing return flow of compressed air from the outlet chamber to said conduit, a second spring-closed check valve in said outlet chamber for normally preventing communication between the outlet chamber and the exhaust chamber, and a manually operable member carried by the casing for opening said second check valve to connect the outlet chamber with the exhaust chamber to reduce the pressure in the tire.

2. A tire inflation control system for a vehicle wheel having a pneumatic tire mounted thereon, comprising a control valve carried by the wheel and provided with a casing having an outlet chamber in communication at all times with the tire and having also an exhaust chamber in communication at all times with the atmosphere, a source of compressed air, means including a conduit for conducting compressed air from said source to said outlet chamber, a first spring-closed check valve in said outlet chamber for preventing return flow of compressed air from the outlet chamber to said conduit, a second spring-closed check valve in said outlet chamber for normally preventing communication between the outlet chamber and the exhaust chamber, and a manually operable push button slidably carried by the casing and having a part extending outwardly of the casing for manually opening said second check valve to connect the outlet chamber with the exhaust chamber to reduce the pressure in the tire.

3. A tire inflation control system for a vehicle wheel having a pneumatic tire mounted thereon, comprising a control valve carried by the wheel and provided with a casing having an outlet chamber in constant communication with the tire and having also an exhaust chamber in constant communication with the atmosphere, a source of compressed air, means including a conduit for conducting compressed air from said source to said outlet chamber, a first spring-closed check valve in said outlet chamber for preventing return flow of compressed air from the outlet chamber to said conduit, a second spring-closed check valve in said outlet chamber for normally preventing communication between the outlet chamber and the exhaust chamber, a manually operable push button slidably carried by the casing and having a part extending outwardly of the casing for manually opening said second check valve to connect the outlet chamber with the exhaust chamber to reduce the pressure in the tire, and means movable with said second check valve to engage and positively hold the first check valve closed when the second check valve is opened.

4. A tire inflation control system for a vehicle wheel having a pneumatic tire mounted thereon, comprising a control valve carried by the wheel and provided with a casing having an outlet chamber in communication at all times with the tire, and having also an exhaust chamber in communication at all times with the atmosphere, a source of compressed air, means including a conduit for conducting compressed air from said source to said outlet chamber, a pair of separate check valves both positioned in said outlet chamber, one of said check valves preventing return flow of compressed air from the outlet chamber to said conduit, and the other check valve normally preventing communication between the outlet and exhaust chambers, a spring interposed between said check valves to yieldably maintain both valves in closed position, and a manually operable member carried by the casing for opening said other check valve to connect the outlet chamber with the exhaust chamber to reduce the pressure in the tire.

5. A tire inflation control system for a vehicle wheel having a pneumatic tire mounted thereon, comprising a control valve carried by the wheel and provided with a casing having an outlet chamber in communication at all times with the tire, and having also an exhaust chamber in communication at all times with the atmosphere, a source of compressed air, means including a conduit for conducting compressed air from said source to said outlet chamber, a pair of separate check valves both positioned in said outlet chamber, one of said check valves preventing return flow of compressed air from the outlet chamber to said conduit, and the other check valve normally preventing communication between the outlet and exhaust chambers, a spring interposed between said check valves to yieldably maintain both valves in closed position, and a manually operable push button slidably carried by the casing and having a part extending outwardly of the casing for manually opening said other check valve to connect the outlet chamber with the exhaust chamber to reduce the pressure in the tire.

6. A tire inflation control system for a vehicle wheel having a pneumatic tire mounted thereon, comprising a control valve carried by the wheel and provided with a casing having an outlet chamber in constant communication with the tire, and having also an exhaust chamber in constant communication with the atmosphere, a source of compressed air, means including a conduit for conducting compressed air from said source to said outlet chamber, a pair of separate check valves in said outlet chamber, one of said check valves preventing return flow of compressed air from the outlet chamber to said conduit, and the other check valve normally preventing communication between the outlet and exhaust chambers, a spring interposed between said check valves to yieldably maintain both valves in closed position, a manually operable push button slidably carried by the casing and having a part extending outwardly of the casing for manually opening said other check valve to connect the outlet chamber with the exhaust chamber to reduce the pressure in the tire, and means movable with said other check valve to engage and positively hold said one check valve closed when said other check valve is opened.

7. A tire inflation control system for a vehicle wheel having a pneumatic tire mounted thereon, comprising a control valve carried by the wheel and provided with a casing having an outlet chamber in constant communication with the tire, and having also an exhaust chamber in constant communication with the atmosphere, a source of compressed air, an axle carrying said wheel, means including an axle housing for rotatably mounting said axle, a duct formed in said axle, a conduit connecting said duct with said outlet chamber, a second conduit extending from said source to said axle housing and terminating in an annular chamber communicating at all times with said duct, a feed valve in said second conduit for governing the pressure of the air conducted to said outlet chamber, sealing means carried by said axle housing and disposed on opposite sides of said annular chamber, a first spring-closed check valve in said outlet chamber for preventing return flow of compressed air from the outlet chamber to the first named conduit, a second spring-closed check valve in said outlet chamber for normally preventing communication between the outlet chamber and the exhaust chamber, a member slidably mounted in the casing and having a part extending outwardly thereof for manually opening said second check valve to connect the outlet chamber with the exhaust chamber to reduce the pressure in the tire, and a part carried by the second check valve to engage and positively hold the first check valve closed when the second check valve is opened.

ELLERY R. FITCH.

References Cited in the file of this patent

UNITED STATES PATENTS

| Number | Name | Date |
|---|---|---|
| 1,039,804 | Richart | Oct. 1, 1912 |
| 1,679,444 | Pagenhart | Aug. 7, 1928 |
| 2,156,841 | Davis | May 2, 1939 |
| 2,452,527 | Peter | Oct. 26, 1948 |